Aug. 25, 1964  W. T. RENTSCHLER  3,145,633
PHOTOGRAPHIC CAMERA WITH BUILT-IN EXPOSURE METER
Filed July 3, 1962  2 Sheets-Sheet 1
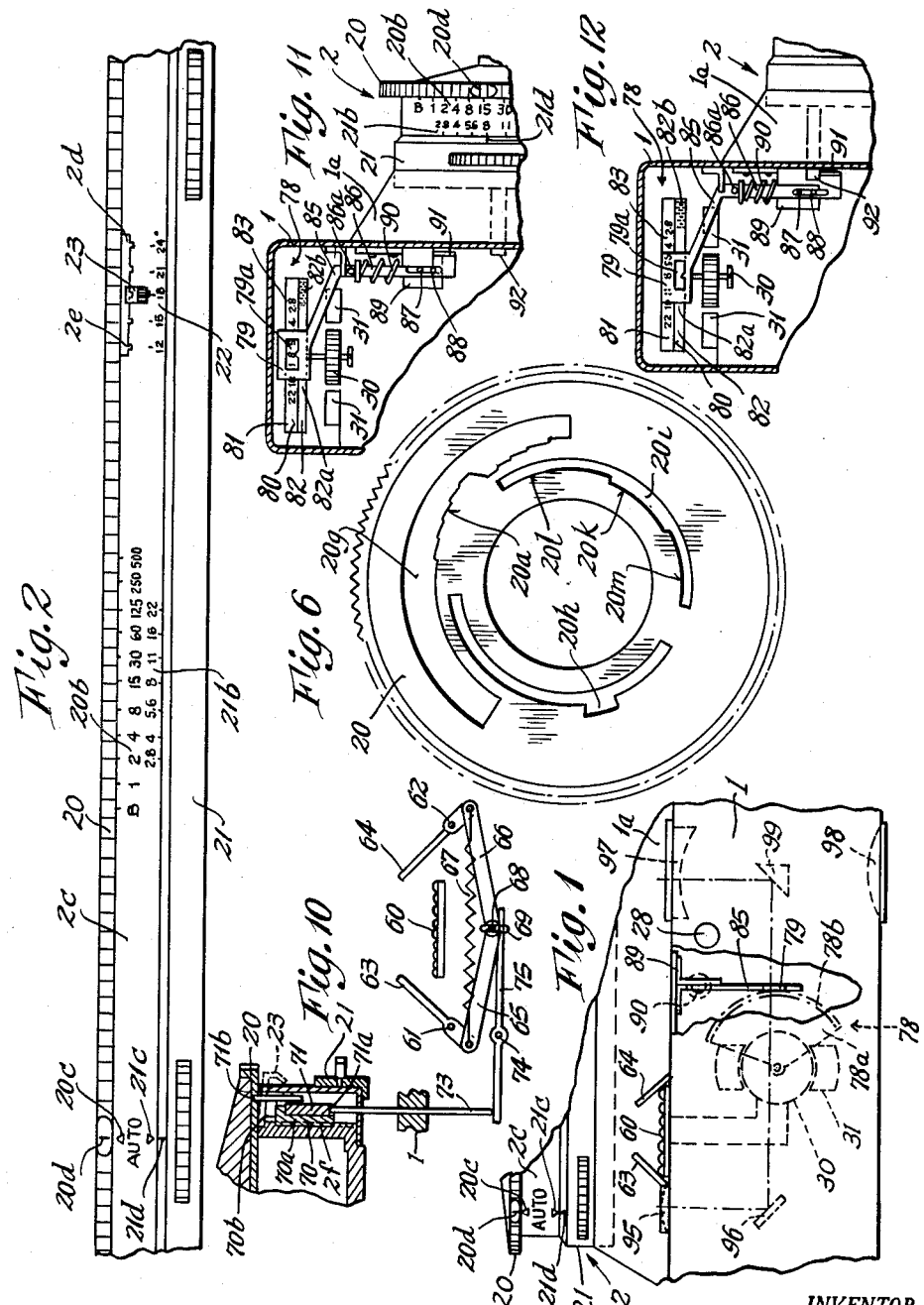
INVENTOR.
Waldemar T. Rentschler
BY
Arthur A. March
ATTORNEY Aug. 25, 1964        W. T. RENTSCHLER        3,145,633
PHOTOGRAPHIC CAMERA WITH BUILT-IN EXPOSURE METER
Filed July 3, 1962                        2 Sheets-Sheet 2
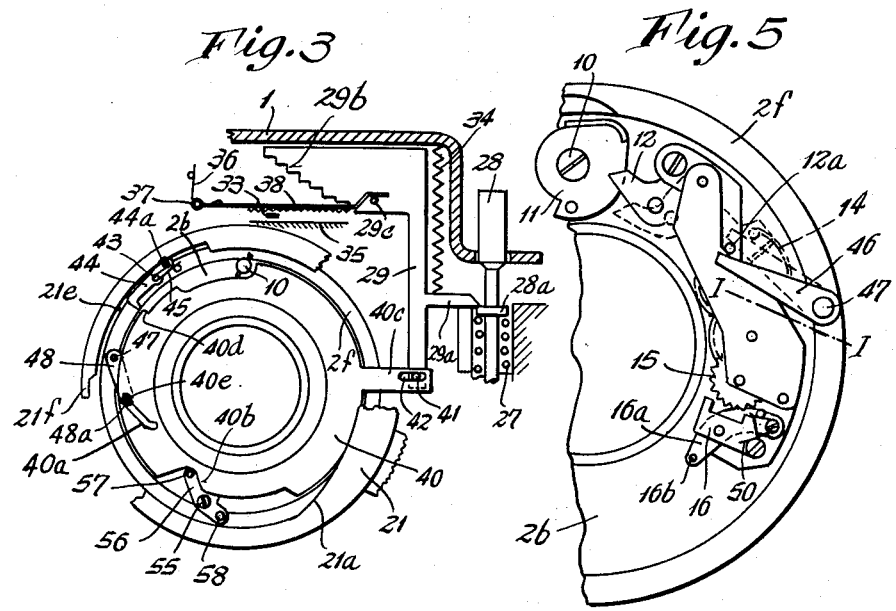
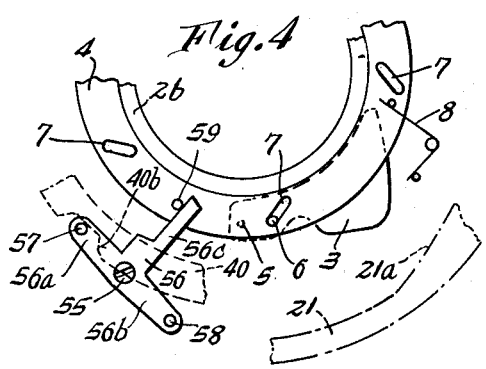
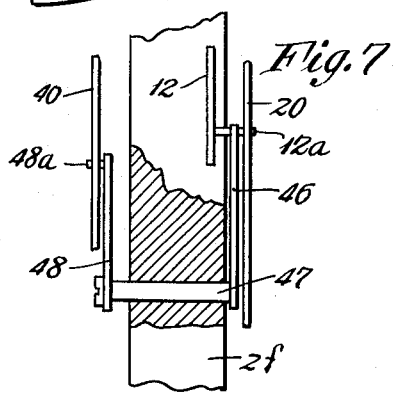
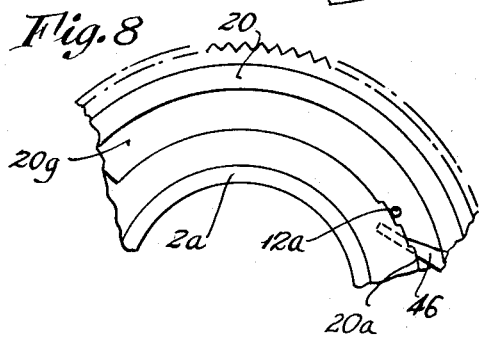
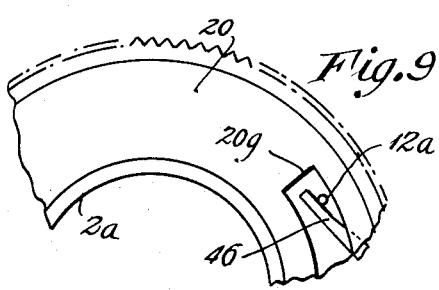
INVENTOR.
Waldemar T. Rentschler
BY
Arthur A. March
ATTORNEY

United States Patent Office 3,145,633
Patented Aug. 25, 1964

3,145,633
PHOTOGRAPHIC CAMERA WITH BUILT-IN
EXPOSURE METER
Waldemar T. Rentschler, Calmbach (Enz), Germany, assignor to Alfred Gauthier, G.m.b.H., Calmbach (Enz), Germany, a corporation of Germany
Filed July 3, 1962, Ser. No. 207,224
Claims priority, application Germany July 8, 1961
5 Claims. (Cl. 95—10)

This invention relates to a photographic camera with a built-in exposure meter and with means to operate both the shutter speed and the diaphragm opening, either automatically under the control of the exposure meter, or manually with the linkage between the exposure meter and both the diaphragm and shutter rendered inoperative.

One of the objects of this invention is to provide a camera in which the operation of the shutter and the diaphragm can be readily switched from completely manual control of both to completely automatic control of both by means of a simple and dependable mechanism. More specifically it is an object of this invention to arrange both the shutter speed control with the diaphragm control so that they may be set to automatic operating positions and to manually controlled positions so that the change of mode of operation from manual operation to automatic operation may be accomplished by the same control mechanism.

In accordance with the foregoing objects, the invention comprises an automatically operable member having a linkage connecting it to a built-in exposure meter and having a plurality of cam surfaces including a cam connected to the shutter controlling mechanism to control the speed of the shutter and another cam connected to the diaphragm control mechanism to set the aperture of the diaphragm. A latching mechanism is provided to prevent movement of the aforementioned member when the diaphragm control member is set to a range of manually controlled positions. At the same time means linking the automatic control member to the diaphragm operating devices is disconnected and is operated under the direct manual control of the diaphragm setting member.

The invention also includes means to adjust the operation of the exposure meter in accordance with the setting of the shutter speed control, taking into account the film speed by means of a separate adjustment linked to the shutter speed control. The exposure meter control includes means to display a simple indication in the view finder of the camera to indicate whether or not a picture can be taken with the camera set to completely automatic control or, with the camera set to completely manual control, to indicate the proper diaphragm aperture for a given shutter speed setting and for the light available from the subject to be photographed.

Details of the invention will become apparent from the following specification and the drawings which illustrate one embodiment of the camera constructed according to the invention and in which:

FIG. 1 shows a partial top view of the camera;

FIG. 2 shows a developed representation of the shutter speed control and diaphragm control and film speed control of the camera of FIG. 1;

FIG. 3 shows the internal mechanism of the camera of FIG. 1 for operating the diaphragm and the shutter speed automatically under control of the exposure meter;

FIG. 4 is a fragmentary view of the mechanism for operating the diaphragm;

FIG. 5 shows a front view of part of the shutter speed controlling mechanism;

FIG. 6 shows the exposure time setting member including the cam surfaces thereof;

FIG. 7 shows a fragmentary cross-sectional view of a part of the mechanism of FIG. 5;

FIG. 8 is a partial view of the exposure time setting member of FIG. 6 in one position;

FIG. 9 is a fragmentary view of the exposure time setting member of FIG. 8 in a different position;

FIG. 10 shows part of the means for controlling the operation of the photocell of FIG. 1;

FIG. 11 shows one partial cross-sectional view of the camera of FIG. 1 set to a position of manual operation of the diaphragm and the shutter speed controlling mechanism;

FIG. 12 shows a view corresponding to the view in FIG. 11 but with the controls set for automatic operation of the diaphragm and the shutter speed controlling mechanism.

Referring now to the drawings, FIG. 1 shows a photographic camera indicated generally by reference numeral 1 with a front plate 1a to which a lens and shutter structure 2 are attached. The shutter 2 is a between-the-lens shutter, having a housing 2b with an annular flange 2a. The internal components of the shutter are shown in detail in the various figures of the drawing.

FIG. 4 shows some of the shutter components including one of the diaphragm lamellae 3 together with a ring 4 that operates this lamellae and all of the others like it. Only one lamella is shown in order to reduce unnecessary detail in the drawing, and it, like the others that are not shown, is pivotally mounted on a fixed pin 5. Lamella 3 is rotated about the pin 5 by means of a second pin 6 attached to the lamella and engaging one of the slots 7 on the ring 4. Two other such slots are shown in the drawing indicating the locations of two of the other diaphragm lamellae. A spring 8 bears against the diaphragm actuating ring 4 to urge it in the counter clockwise direction with the lamella 3 in the open position.

FIG. 5 shows certain of the parts used in controlling the blades of the shutter itself. These parts include a shaft 10 which projects from the back of the shutter housing 2b and which is connected to a conventional shutter cocking device (not shown). A cocking and driving disc 11 which cooperates with a brake lever 12 is mounted on the shaft 10 and is connected to the shutter blade driving ring by means of a pawl (not shown). The control device which determines the duration of the shutter opening when a picture is being taken includes a gear train 14 which is connected to the lever 12, an escapement wheel 15, and an anchor 16 that may be connected to the escapement wheel 15 or disconnected therefrom for different modes of operation as will be described hereinafter.

The operation of the shutter controlling mechanism is in turn controlled by an exposure time setting member 20 which, together with a diaphragm setting member 21, is one of the two principal adjustment members used in operation of the camera. These control members 20 and 21 are shown in various figures of the drawing and are illustrated in developed form in FIG. 2 where the members, which are normally in the form of rings, are stretched out flat. The exposure time setting member 20 cooperates with a fixed time scale 20b with indicia representing various durations of exposure which, in the example shown, range from "bulb" indicated by the letter "B" to 1/500 of a second. In addition to these indicia there is a mark 20c which indicates a setting position for automatic operation of the shutter in a manner to be described hereinafter. The member 20 includes a pointer 20d which may be set opposite the mark 20c or any of the marks in the scale 20b in accordance with the desired operation of the shutter.

The diaphragm setting member 21 also cooperates with a fixed scale 21b that indicates the diaphragm aperture size and a fixed mark 21c which indicates a position of automatic operation of the diaphragm. The setting of the member 21 with respect either to the automatic position 21c or the range of manual positions 21b is indicated by a pointer 21d which may be set opposite either the mark 21c or any of the numeral indicia in the scale 21b as the setting member 21 is rotated.

In addition there is a scale 22 on the fixed auxiliary ring 2c for adjusting operation of the camera in accordance with the sensitivity, or speed, of the film being used. This scale is used in conjunction with a detent lever 23 which slides in a slot 2d in the auxiliary ring 2c and which has certain detent notches 2e.

FIG. 3 shows some of the linkages by which automatic operaion of the shutter and the diaphragm may be accomplished. In this figure there is shown a trigger, or shutter release pin, 28 to be depressed by the photographer in order to take a photograph. This pin is held in its upper position by means of a compression spring 27 within the camera case 1. A sensing member 29 has an arm 29a that rests upon a flange 28a on the shutter release pin 28. The sensing member 29 cooperates with a built-in exposure meter including a coil 30 and an armature 31 (shown in FIG. 1) and a needle, or pointer, 33 which is shown in an end-on view in FIG. 3. The needle 33 is connected to the rotating coil 30 to be moved back and forth in response to current flowing in the coil, which in turn is determined by the light striking the camera. A compression spring 34 pushes against the arm 29a of the sensing member 29 to hold the arm 29a in contact with the flange 28a as the latter moves downwardly when the shutter release pin 28 is pressed to take a picture. While the spring 34 keeps the arm 29a in contact with the flange 28a it is not as strong as the spring 27 and therefore does not move the shutter release pin 28 by itself.

The sensing member 29 is provided with a stepped cam 29b which moves downwardly as the shutter release pin 28 is depressed until one of the steps of the cam makes contact with the pointer 33 and pushes the pointer against a stationary support surface 35. The particular one of the steps that makes contact with the pointer 33 depends upon the location of the pointer, which may vary slightly to the left or considerably to the right from its position as shown in FIG. 3. However, it is quite possible that the pointer 33 will not be directly under any single step of the cam 29b but only partially under a step so that it may be flipped to the left as the cam 29b descends. In order to hold the pointer stationary, whatever its position, means are provided to engage the pointer prior to engagement by the cam 29b. Such means include a resilient spring 36 that urges a clamping lever 38 in the clockwise direction around an axle 37. The lever 38 is supported by a pin 29c on the sensing member 29 so that when the latter is in its uppermost position prior to the taking of a picture, the lever 38 is held out of contact with the pointer 33, which can then move to the left or right underneath the lever. As the sensing member 29 descends, the support furnished to the lever 28 by the pin 29c is removed and the lower surface of the lever, which may be roughened as shown, falls against the pointer 33 and presses it against the surface 35 to hold the pointer in place against any possible lateral movement that might be caused by the stepped cam 29b. The force exerted by the spring 36 is relatively weak so that, even when combined with the force of the spring 34, it is still not sufficient to overcome the force of the spring 27.

One of the central members for automatic operation of both the diaphragm and shutter of the camera is a setting member 40 which is shown in FIG. 3. This setting member has a number of cam surfaces and it also has an arm 40c with a slot 42, in which a pin 41 on the sensing member 29 engages so that, as the sensing member moves downwardly under the force of the spring 34 when the shutter release member 28 is depressed, the engagement between the pin 41 and the slot 42 causes the arm 40c and thus the setting member 40 to be rotated clockwise. When this is done a cam 40a actuates means to control the duration of exposure, or opening of the shutter, and another cam 40b controls the diaphragm so as to determine the size of the aperture. The cams 40a and 40b have a predetermined relationship to permit time-diaphragm combinations in the range from 1/30 of a second and a diaphragm setting of f2.8 to 1/500 of a second and f22 to be set automatically when both the diaphragm setting member 21 and the exposure time setting member 20 (FIG. 2) are adjusted to the automatic marks 21c and 20c respectively.

When the camera is set for manually controlled exposure, the automatic setting member must not rotate when the shutter release pin 28 is actuated. To hold the member 40 in place, a catch 44 is pivotally mounted on a pin 43 in the rim 2f of the shutter housing 2b to engage a locking edge 40d. The catch 44 is urged to move counterclockwise by a spring 45 so as to engage the edge 40d but is prevented from so moving by the pressure of the surface 21e of the diaphragm setting member 21 when the latter is set at its automatic position, as depicted in FIG. 3. However, when the member 21 is rotated clockwise until the mark 21d is opposite the scale 21b (see particularly FIG. 2) section 21f moves over the catch 44 and the cam follower pin 44a moves outwardly under pressure from the spring 45, thus permitting the other end of the catch 44 to engage 40d.

FIGS. 5 and 7 show front and partial cross-sectional views of part of the mechanism for controlling the duration of exposure or shutter speed. This mechanism includes a lever arm 46 which is rigidly attached to a shaft 47 that is pivotally mounted in the cylindrical rim 2f of the shutter housing 2b. On the other side of the shutter a second arm 48 is also rigidly attached to the pin 47 to move simultaneously with the arm 46, and a pin 48a on the arm 48 engages the automatic setting member 40 as may be seen particularly in FIG. 7. The arms 46 and 48 are parallel to each other in the embodiment described.

The arm 46 cooperates with the brake lever 12 by means of a pin 12a that extends from the brake lever and engages the arm 46. This pin 12a, as may be seen in FIG. 7, is long enough to engage not only the arm 46 but also the exposure time setting member 20, part of which is shown in this figure. The relationship of the pin 12a and the arm 46 to the exposure setting member 20 is also shown in FIGS. 8 and 9, where it may be seen that the pin 12a rides upon the cam surface 20a except when it is displaced therefrom by the arm 46.

The mechanism on the other side of the rim 2f is shown in FIG. 3 where arm 48 may be seen connected to the cam 40a by means of the pin 48a. It is necessary for proper operation of the shutter in its automatic position that the pin 12a of the brake lever 12 be able to move freely in a radial direction for at least a short distance. In order to make this possible, the exposure time setting member 20 is provided with a relatively wide opening 20g which allows the driving pin 12a to have the necessary freedom of motion when the setting member 20 is set in its automatic position. Thus, in the automatic position the pin 12a will be moved back and forth more or less radially in the wide opening 20g by means of the lever 46 which, in turn, is controlled by the pin 48a in the cam 40a.

On the other hand when the setting member 20 is moved to the manual control range in which the shutter speed is to be determined by the control device 12 to 16, in connection with the control cam 20a the pin 12a must rest against the surface of the control cam 20a and the lever 46 must be out of contact with the pin 12a, as is shown particularly in FIG. 8. For this purpose the control cam 40a of the automatic setting member 40, as shown in FIG. 3, is extended at one end by a short radially obliquely extending section 40e which is so shaped as to correspond to the path through which the sensing member 29 must travel before the lowermost step of the cam 29b reaches the pointer 33 of the built-in exposure meter.

The exposure time setting member 20 is shown separately in FIG. 6. In this figure there are two openings or recesses 20h and 20i in addition to the opening 20g referred to hereinabove. The opening 20h cooperates with a "B" lever (not shown) of the shutter which permits exposures of extended duration to be made. The recess 20i cooperates with the lever 16a (FIG. 5) which carries the anchor 16. For this purpose a pin 16b on the lever 16a extends into the opening 20i and is pressed by means of a spring 50 against the surfaces 20k, 20l, and 20m of the opening 20i. These surfaces are arranged in such a way that the anchor 16 comes into operation when a longer exposure time than 1/30 of a second is desired. Thus, when the pointer 20d of FIG. 2 is set at some position between B and 30 on the scale 20b, the pin 16 is in contact with section 20k but when the pointer 20d is set either to the automatic mark 20c or to that portion of the scale 20b between 30 and 500 (that is 1/30 of a second to 1/500 of a second) the anchor 16 must be moved so that the escapement wheel 15 is able to rotate without engaging the armature. Therefore the pin 16b is in contact with the section 20l when the pointer 20d is set either to the automatic position 20c or to the bulb position B of the scale 20b and the pin 16b is in contact with the section 20m when the pointer 20d is somewhere between the mark 30 and 500 of the scale 20b.

Referring back to FIG. 4 and to FIG. 3 it will be recalled that both the exposure time setting member 20 and the diaphragm setting member 21 are rotatably positioned on the housing 2b of the shutter 2. A three-armed lever 56 is pivotally mounted on a pin 55 on the shutter housing 2b. The lever 56 has two arms 56a and 56b extending in substantially a straight line on opposite sides of the pin 55. The arm 56a has a cam follower pin 57 that cooperates with a control cam 40b on the automatic setting member 40 for automatic setting of the diaphragm lamellae 3, while the arm 56b has a cam follower pin 58 that engages the cam surface 21a of the diaphragm setting member 21 when the latter is moved to its manual setting range.

As is shown in FIG. 4, a driving pin 59 is located on the actuating ring 4 that controls the positions of the lamellae 3 to set the aperture of the diaphragm. A third lever arm 56c of the lever 56 engages the pin 59, which is urged against the arm 56c by the pressure of the spring 8 upon the ring 4. The lever 56 is prevented from moving in a clockwise direction under the pressure of the pin 59 either by contact between the pin 57 and the control cam 40b or by contact between the pin 58 and the cam 21a when the diaphragm setting member 21 is moved into position for manual operation.

FIG. 10 illustrates somewhat diagrammatically a shading device which affects the operation of the exposure meter. The photosensitive device that is the heart of the exposure meter is a photoelectric cell 60 which is located in the camera in position to receive light from the scene to be photographed. The control device that affects the operation of the photocell 60 comprises a pair of doors 63 and 64 which are pivotally mounted on hinge pins 61 and 62, respectively, so that they can fold in front of the photocell 60. Door 63 is operated by a push rod 65 and door 64 by a push rod 66, and the doors are normally held in the open position by means of a spring 67. The push rods 65 and 66 are joined together by a pin 68 which is free to move within a slot 69 located on the camera housing 1.

The control means for the doors 63 and 64 include a ring 70 which is internally threaded and rotatably positioned on the externally threaded rim 2f of the shutter housing 2b. A second ring 71 is held in place in an annular groove 70a of the ring 70 so that it can rotate, but cannot move axially, with respect to the ring 70. The edge of the ring 71 that faces the camera housing constitutes a control cam 71a which may have, for example, a helical configuration. A push rod 73 bears against the cam surface 71a to be axially displaced with respect to the camera housing 1 in accordance with the convolutions of the cam surface 71a. The other end of the push rod 73 bears against a lever 75 mounted on a pivot 74. The other end of the lever 75 engages the arms 65 and 66 to push them back and forth in accordance with the movement of the push rod 73 as controlled by the movement of the cam 71a.

The detent 23, which is also shown in FIG. 2 and is the means by which operation of the camera is adjusted for film speed, is connected to the threaded ring 70 by means of a coupling pin 70b. Thus, as the detent lever 23 is adjusted within its slot 2d in order to adjust for different film speeds, the ring 70 not only rotates on the threaded rim 2f but also moves axially to some extent, dependent upon the pitch of the thread of the rim 2f. This axial movement of the ring 70 is transmitted by way of the push rod 73 and the lever 75 to open the doors 63 and 64 wider or to close them up more, depending on which direction the ring 70 is rotated. In addition the doors 63 and 64 are also controlled by rotation of the ring 71, which is operatively connected to the exposure time setting member 20 by means of a coupling pin 71b. This rotary movement of the ring 71 is independent of rotary movement of the ring 70 and is controlled, instead, by rotation of the exposure time setting member 20. In any event, the degree to which the doors 63 and 64 are open to permit light to reach the photocell 60 is controlled both by the detent 23 that adjusts for film speed and the exposure time setting member 20.

FIGS. 1, 11, and 12 illustrate means for indicating to the photographer the conditions for taking a photograph. These means include a meter having a rotating coil 30 and a magnet 31 which provides a magnetic field that cooperates with the magnetic field of the coil 30 to determine the degree of rotation of the latter as the coil is traversed by current generated in the photo-electric cell 60. An indicating member 78 is connected to the coil 30 so as to be rotated thereby, and a mask 79, supported from the wall of the camera, cooperates with the indicating member 78. The indicating member includes a plate 78a having a skirt 78b which is transparent. This skirt is divided by a line 80 as shown in FIGS. 11 and 12 into two bands 81 and 82. The top band has a scale 83 with numerical indicia corresponding with the proper diaphragm aperture setting of the setting member 21. The lower band 82 may simply be tinted with different colored sections 82a and 82b, for example, red and green respectively.

The mask 79 that cooperates with the indicating member 78 may be arranged to slide vertically so as to expose either a portion of the upper section 81 or the lower section 82 of the skirt 78b through a window 79a, depending upon whether the camera is set for manual operation or automatic operation, respectively. In FIG. 11 the camera is set for manual operation and the mask 79 is positioned to cooperate with the upper section 81. As may be seen, the mask 79 is supported on an arm 85 which is firmly connected to a sliding rod 86 to be supported thereby. The rod 86 slides in a slotted guide 87 and 88 which is held by a frame 89 attached to the camera case 1. A spring 90 urges the frame 79 up to its upper position in front of the section 81 by pressure upon a flange held in place by a pin 86a.

In order to move the sliding rod 86, and hence the frame 79 down to the lower position, an arm 91 extending from the rod 86 is engaged by a driving member 92 that extends from one of the setting members which is used to change the camera from manual operation to automatic operation. Since the diaphragm setting member 21 accomplishes this function, the driving pin 92 is attached to it. As may be seen in FIG. 12 the driving member 92 has engaged the arm 91 and has moved the arm together with the frame 79 down to a lower position as required for automatic operation of the camera.

The camera case which has a light incidence window 95 arranged in the front side of the case as shown in FIG. 1 and a mirror 96 is fixed in the interior of the case to reflect light entering through the window 95 and to direct the reflected rays through the skirt 78b of the indicating member 78 in the region of the mask opening 79a. The camera also has a pair of view finder lenses 97 and 98 together with a prism 99 which is located in the optical path between the lenses 97 and 98 and which intercepts the light rays that pass through the opening 79a of the frame 79 and reflects them directly into the scene visible in the view finder lens. Thus, there appears in the view finder either a specific diaphragm value, if the camera is being operated manually with the frame opening 79a in front of the upper section 81, or else a specific color, if the camera is being operated automatically and the frame opening 79a is in front of the lower section 82. The appearance of a green color in the view finder lens indicates that a picture may be taken under the prevailing light conditions, while if a red color is present, it acts as a warning against carrying out an exposure.

The operation of the camera is as follows:

If the camera is to operate with automatic exposure setting, which includes automatic control both of the shutter speed and of the diaphragm aperture, the exposure time setting member 20 and the diaphragm setting member 21 must be moved so that their respective setting marks 20d and 21d coincide with the fixed marks 20c and 21c on the ring 2c as shown in FIG. 2. The internal mechanism will then be as shown in FIG. 3. All that a photographer has to do is to look through the view finder lens 98 at the scene that he wishes to photograph. If the scene has a green tint, he will know that it is possible to take a picture, but if it has a red tint, he will know that it is not possible to take a picture without changing to manual control. The color of the tint will be determined by whether the light passes through section 82a or section 82b of the skirt 78b and this is determined by the angular position of the indicating member 78, which in turn is determined by the electrical current through the coil 30 resulting from the electrical signal generated in the photocell 60 by light impinging thereon from the scene to be photographed.

Assuming that the light conditions are proper, the shutter release pin 28, shown in FIG. 3, may be depressed, which will compress the spring 27 and will permit the arm 29a, and hence the sensing member 29 to move downwardly. As the sensing member moves downwardly, the pin 29c drops away from the lever 38 and permits the lever to press the pointer 33 against the fixed support 35. The sensing member 29 will continue to move downwardly until one of the steps 29b comes into contact with the pointer 33 at which point the sensing member will be unable to move downwardly any further. As the sensing member moves, it rotates the arm 40c and thus causes the setting member 40 itself to rotate. As this happens, the pin 48a is moved by the cam slot 40a to cause the lever arm 48 to pivot by an amount which is determined by the extent of rotation of the setting member 40. As disclosed in connection with FIG. 7, movement of the arm 48 causes a corresponding movement of the arm 46 which lifts the pin 12a away from contact with the setting member 20 and into the free space of the open area 20g. At the same time movement of the pin 12a causes the brake lever 12 to be rotated (see FIG. 5) which cooperates with the cocking and driving disc 11 of the shutter to control the duration of opening of the shutter.

At the same time, the rotation of the setting member 40 causes the cam surface 40b to move the cam follower pin 57, which in turn rotates the lever 56 and causes the arm 56c to push against the pin 59 and thereby to rotate the ring 4. As the ring 4 rotates, the individual slots 7 move with respect to the individual pins 6 and thus cause the lamellae 3 to be rotated about their individual axles 5 so as to reduce the aperture of the diaphragm. The extent to which the diaphragm aperture will be reduced from its wide open position is determined by the extent to which the lever 56 is rotated, which in turn is determined by the angle through which the setting member 40 is rotated under the control of the sensing member 29.

Thus the setting of both the shutter speed and the diaphragm aperture are determined automatically in response to movement of the sensing member 29 in the first part of the movement of the shutter release pin 28. Continued downward movement of the pin 28 eventually releases the shutter in accordance with standard operation and permits the shutter blades to open briefly and to close again in the usual manner. Thereafter the release of pressure upon the pin 28 permits the pin to be raised to its uppermost position by the force of the spring 27, which also raises the sensing member 29 and rotates the setting member 40 back to its counterclockwise position. This returns the shutter speed mechanism 12 to 16 to the point at which it will permit the shutter to be opened for $\frac{1}{30}$ of a second or less in taking the next picture. The diaphragm is reset for the largest available aperture.

Now if the photographer wishes to take photographs with exposure time settings and diaphragm settings controlled manually by him, he must move the exposure time setting member 20 until the point 20d is opposite one of the indicia of the scale 20b. He must also adjust the diaphragm setting member 21 so that its pointer 21d is opposite one of the diaphragm indicia in the scale 21b.

In setting the pointer 20d the photographer chooses an exposure speed for the job at hand. For example, if it is desired to take an action shot, a relatively high exposure speed may be chosen. In any event, in setting the member 20, the ring 71 shown in FIG. 10 will be rotated by means of the pin 71b that connects that ring to the exposure time setting member 20. As the ring 71 rotates it will actuate the push rod 73 and the lever 75 to open or close the doors 63 and 64. The faster the shutter speed setting, the more the doors will be closed and the less light will be permitted to impinge upon the photoelectric cell 60. As a result of the reduction in light striking the photoelectric cell 60 when the doors 63 and 64 are closed to a greater degree, less current will be available to flow through the coil 30 (FIG. 11) and therefore the indicating member 78 will be twisted less for a given amount of illumination by the scene than if a lower shutter speed were chosen. This will cause a portion of the scale 83 having relatively small "$f$" numbers to appear in the opening 79a.

After the desired exposure time has been chosen the actual switching of the camera from automatic operation to manual operation is effected by rotating the diaphragm setting member 21 so that the pointer 21d moves toward the scale 21b. As a result of this rotation of the member 21, the arm 92 attached to it releases the arm 91 and permits the spring 90 to push the shaft 86 and consequently the frame 79 upwardly so that the opening 79a is in front of the upper section 81 of the skirt 78b. As a result light entering the camera through the window 95 and being reflected through the upper band 81 will project an image of the numerical indicia visible through the opening 79a on to the field of view that may be seen in looking into the view finder lens 98. By virtue of the fact that the sensitivity of the built-in exposure meter is adjusted by means of the doors 63 and 64 to take into account the shutter speed setting of the member 20, the number visible through the lens 98 will be the proper diaphragm aperture setting for the light conditions and shutter speed chosen.

The only remaining operation is for the photographer to adjust the diaphragm setting member 21 to a position at which the pointer 21d is opposite the same numerical indicia of the scale 21b as is visible through the view finder lens 98. When this is done the cam surface 21a (FIG. 4) engages the cam follower pin 58 of the lever 56 and rotates the lever 56 counterclockwise thereby pushing the pin 59 in a clockwise direction and closing the diaphragm lamellae 3 to an aperture setting corresponding to the chosen number on the scale 21b. This causes the cam follower pin 57 to be moved away from the cam surface 40b because it will no longer be actuated thereby. At the same time the sensing pin 44a of the catch 44 will move into the cam area 21f, thus permitting the catch 44 to rotate counterclockwise and engage the edge 40d of the member 40, which locks the member 40 against rotation when the shutter release pin 28 is depressed.

The exposure setting of the camera in the manual setting range can, of course, be effected without recourse to the built-in exposure meter since the photographer can set both the shutter speed and the diaphragm aperture completely freely. For example, the camera may be operated for exposures of considerable time by adjusting the exposure time setting member 20 so that its pointer 20d is opposite the indicia B of the scale 20b.

While the invention has been described in detail in connection with one illustrative embodiment thereof, it will be understood that variations and modifications may be made without departing from the spirit of the invention or the scope of the appended claims.

I claim:
1. In a photographic camera having an exposure meter, the improvement of selecting means for effecting either manual or automatic operation of said camera, said selecting means including an exposure time setting member and a diaphragm setting member, each of said setting members being independently operable for setting the exposure time and aperture size respectively in the manual setting range thereof, shutter means, a shutter control device operatively connecting said exposure time setting member to said shutter means whereby the latter is rendered responsive to the setting of said exposure time setting member, a diaphragm maens, a diaphragm control device operatively connecting said diaphragm setting member to said diaphragm means whereby the latter is rendered responsive to the setting of said diaphragm setting member, an automatic setting member responsive to the light intensity of said exposure meter when in the automatic setting of said selector means, a first and second transmission means, said first transmission means being operatively connected between said automatic setting member and said shutter control device and said second transmission member being operatively connected between said automatic setting member and said diaphragm control device in the automatic setting of said selector means so that an automatic exposure takes place according to a predetermined time-diaphragm program, and means for locking said automatic setting member in starting position in the manual setting range of said selector means.

2. The invention as defined in claim 1 wherein said automatic setting member includes control means for said exposure time and diaphragm which in the manual setting of said selector means are free of any influence from said first and second transmission means, and the developments of the exposure time and diaphragm setting members is such that in the automatic setting thereof, the control means of said setting members occupying a position in which they exert no influence on the control devices for the exposure time and diaphragm.

3. A photographic camera according to claim 1 comprising, in addition, a movable member attached to said exposure meter to be moved thereby in accordance with light striking said exposure meter, said member having a pair of sections, a covering mask movable into two positions cooperating with said sections of said movable member, and means operatively connecting said mask to said diaphragm setting member to move said mask to expose part of one of said sections when said diaphragm setting member is set to its manual position and to the other of said sections when said diaphragm setting member is set to its automatic position.

4. A photographic camera according to claim 3 in which said one section has numerical indicia corresponding to the aperture settings of said diaphragm.

5. A photographic camera according to claim 3 comprising a cam operatively engaging said exposure time setting member to be moved thereby, means controlling the sensitivity of said exposure meter, and means operatively connecting said cam to said last named means when said exposure time setting member is set to a position for manual control of the exposure time.

References Cited in the file of this patent
UNITED STATES PATENTS
3,013,478     Gebele _____ Dec. 19, 1961